June 6, 1967 — M. SCHRAEGER — 3,323,677
UTENSIL ATTACHMENT
Filed May 28, 1965 — 2 Sheets-Sheet 1
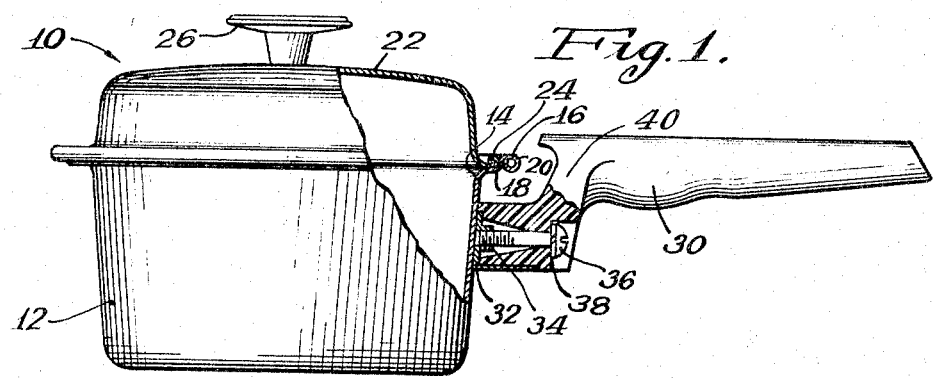
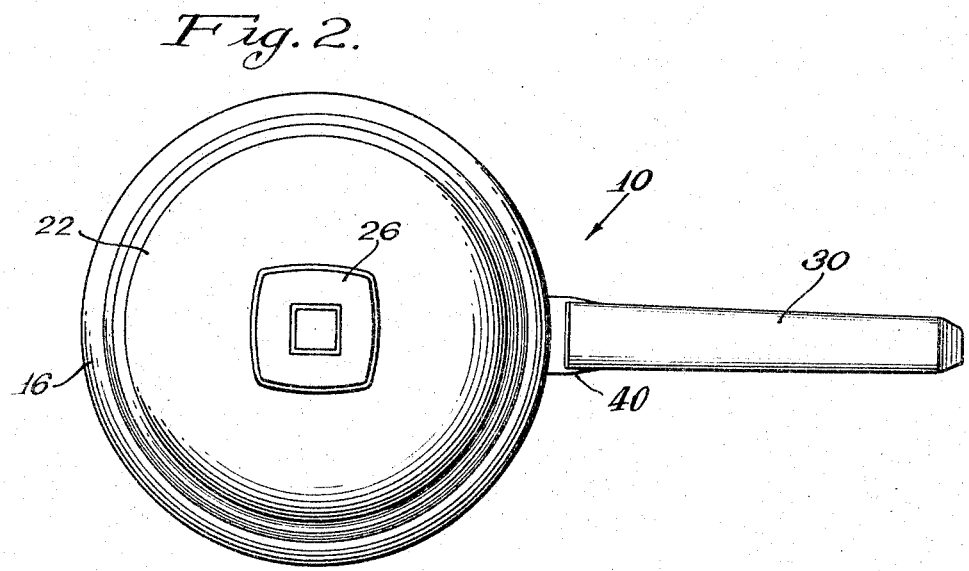
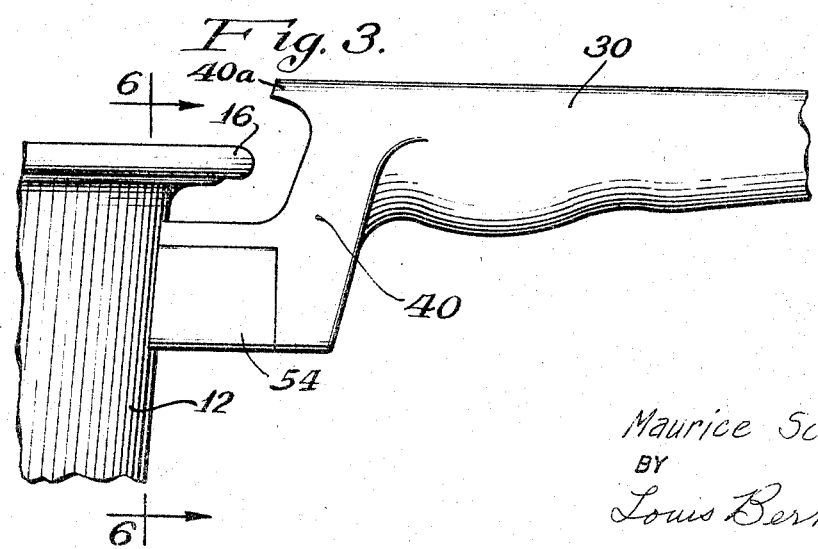
INVENTOR
Maurice Schraeger
BY
Louis Bernat
ATTY.

June 6, 1967
M. SCHRAEGER
3,323,677
UTENSIL ATTACHMENT
Filed May 28, 1965
2 Sheets-Sheet 2
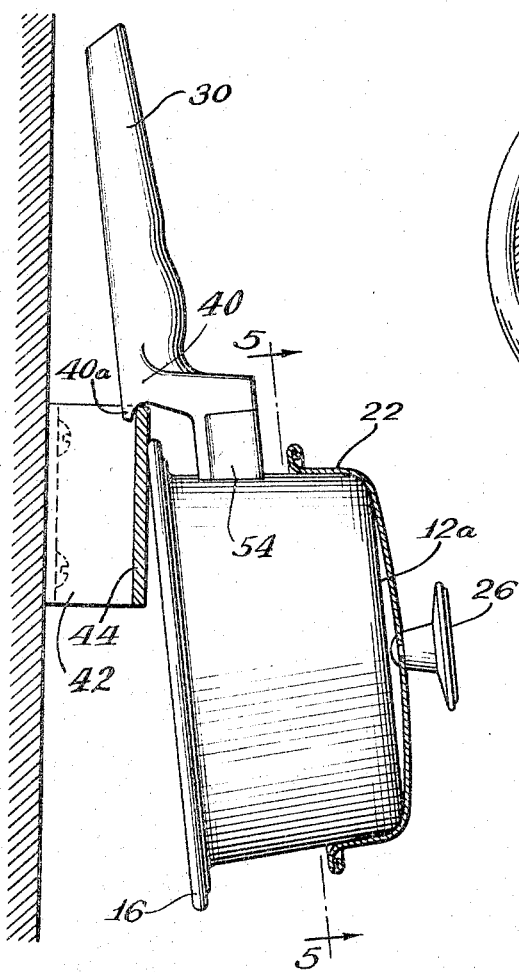
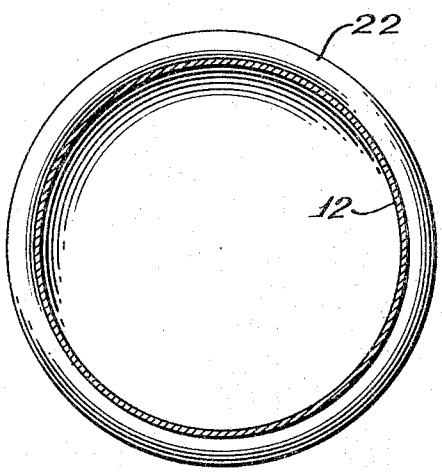
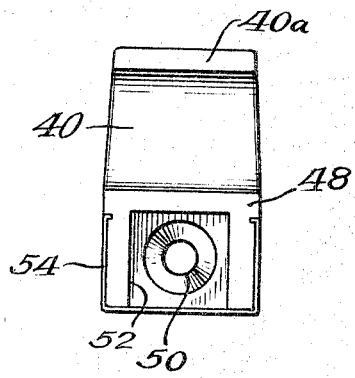
INVENTOR
Maurice Schraeger
BY
Louis Bernat
ATTY.

United States Patent Office 3,323,677
Patented June 6, 1967

3,323,677
UTENSIL ATTACHMENT
Maurice Schraeger, Glencoe, Ill., assignor to Flavor-Seal Corporation, a subsidiary of Cory Corporation
Filed May 28, 1965, Ser. No. 459,696
2 Claims. (Cl. 220—94)

This invention relates to a covered cooking utensil and, more particularly, to means for conveniently and attractively supporting both the utensil and the cover therefor on an upright support, as for example, a wall bracket.

The storage of utensils, such as pots and pans, and the covers therefor has oftentimes been troublesome to the housewife, especially when the kitchen area was small and storage space was limited. To free some cupboard space, it was proposed that certain pots be hung on the wall. The handle for the pot or like container was provided with a hook at its free end and such hook was adapted to be engaged with a support bracket affixed to the wall. The cover was hung on a separate hook or support bracket or was stored elsewhere. Considerable wall space was required if the cover were hung separately from the container. Inconvenience resulted if the cover were stored separately, for the housewife often had to hunt for the cover that was sized for a particular container.

An object of this invention is to provide improved means for supporting both a utensil and its cover on a single wall support.

A further object of the present invention is to provide a covered utensil including a container and a cover, the container having an annular flange disposed about the open top of the container and a handle having a hook portion thereon adjacent the open top of the container for engaging a bracket, the handle and the flange cooperating to support the substantially planar bottom of the container at an angle inclined to the vertical, the cover being complementary in configuration to the bottom of the container and being adapted to be supported on the container when the container is hung on the bracket without the necessity for ancillary supporting means. Further objects and advantages of this invention will become more apparent hereinafter.

The novel features and the novel structural components and their mode of functioning will be made most manifest and particularly pointed out in clear, concise and exact terms in conjunction with the accompanying drawing, wherein:

FIGURE 1 is a side view of a covered cooking utensil embodying the principles of the present invention, with parts broken away for clarity;

FIGURE 2 is a top plan view of the covered cooking utensil illustrated in FIGURE 1;

FIGURE 3 is a side view, on an enlarged scale, illustrating the relationship between the hook portion of the handle and the flange on the utensil;

FIGURE 4 is a side view of the cooking utensil of the present invention, shown in hanging position with the cover carried on the bottom of the utensil;

FIGURE 5 is a cross-sectional view taken generally along the line 5—5 of FIGURE 4; and FIGURE 6 is an end view of the handle for the covered cooking utensil, taken generally along the line 6—6 of FIGURE 3.

Referring to FIGURES 1 and 2, there is illustrated a covered cooking utensil 10 embodying the principles of the present invention. The utensil, which may be a pot or a pan for example, comprises a deep drawn metallic container 12 having an open top 14.

Circumscribing the open top 14 of the cup-shaped container 12 is an annular flange 16 that includes an annular shoulder portion 18 for receiving a cover thereon and a rolled portion 20 that provides an attractive and smooth surfaced end to the flange 16.

The cover 22, which is also drawn or formed in a cup-shaped configuration, has a rolled end or flange 24 at the bottom thereof that is adapted to engage with and rest upon the should 18 on the flange 16. A suitable handle or knob member 26 is affixed to the top of the cover for permitting manual handling of the cover in use. The knob 26 is preferably formed from a durable heat insulating material, such as plastic.

An elongated handle 30 is adapted to be connected to the container 12 spaced below the annular flange 16. Secured to the side of the container 12, as for example, by welding, is a suitable bracket 32 having a threaded tubular portion 34 extending outwardly therefrom. The end of the handle 30 adjacent to the container has a recess therein that is complementary in shape to the bracket 32, and such shape is non-circular, so that when the screw 36 is joined to the threaded tubular portion 34 of the bracket 32, the handle 30 will be fixed to the container 12 and rotation thereof with respect to the container 12 will be prevented. A lock washer 38 may be provided to maintain the screw 36 in position and prevent undesirable unthreading of screw 36 from the tubular portion 34 of the bracket 32.

The knob 26 and the handle 30 are each preferably made from a plastic that will resist high temperatures, while permitting manual handling of the cover 22 and the container 12, respectively. The container 12, which may be either a pot or a pan, and the cover 22 may be suitably formed from metal, such as stainless steel or aluminum.

A feature of this invention is the provision on the elongated handle 30 of a hook-like portion 40 that partially surrounds the adjacent portion of flange 16 and extends in spaced relation above, below, and to the side of flange 16. The relationship of the hook portion 40 of the handle 30 with respect to the flange 16 on the container 12 is best shown in FIGURES 3 and 4.

Referring now to FIGURE 4, there is illustrated the position of the container supported on a wall bracket, with the cover carried on the bottom of the container. The rim 44 on the wall bracket 42 is engaged in such manner between the hook portion 40 of the handle 30 and the flange 16 on the container 12 that the plane passing through the flange 16 is tilting slightly with respect to the vertical. As the plane through the flange 16 and the plane through the bottom 12a of container 12 are parallel, the bottom 12a is also tilted or inclined with respect to the vertical. The angle of tilt determined by the construction of the hook portion 40 and the cooperation between the hook portion 40 of the handle 30 and the flange 16 is slightly greater than the angle of draw of the cover 22. The taper of the container corresponds to the taper or draw of the cover. Thus, the cover 22, which has an inner configuration complementary to the exterior configuration of the bottom portion of the container 12, may be slid upon and retained upon the container 12 as it hangs upon the wall.

As is evident from FIGURE 5, the cover 22 will snugly engage the bottom of the container 12 on all sides. Though the container and cover are shown to be circular in cross section, it will be apparent that the invention may be employed for other shapes.

By virtue of the novel configuration of the handle and the cooperation between the container handle and the flange circumscribing the open top 14 of the container 12, the cover 22 may be retained on the container 12 when the container is hung from an upright support bracket.

In one preferred form of the invention, the draw angle on the sides of the container 12 and the cover 22 is approximately 90 degrees. It has been found that in order to support the cover on the container when the container is hung, the hook portion 40 of the handle must cooperate with the flange 16 to support the containers such that the flange 16 and the bottom 12a make an angle with the vertical of at least 11 degrees.

Referring to FIGURE 6, there is illustrated an end view of the handle looking toward the hook portion. The widened bottom portion 48 of the handle 30 has an opening 50 extending therethrough. The screw 36 for fastening the handle 30 to the side of the container is adapted to pass through the opening 50. A recess 52 is defined in the end of the widened portion 48 of the handle 30 about the opening 50. The recess 52 is non-circular and is substantially complementary in configuration to the exterior of the bracket 32 fixed to the side of container 12. Such construction is for the purpose of maintaining the handle in position on the side of the container 12 and for preventing rotation thereof with respect to the container.

A decorative metal or plastic strip 54, generally U-shaped in configuration, may be affixed on the widened portion of the handle 30. It will be noted that the hook end 40a extends transversely substantially coextensive with the width of the handle 30. Preferably, the handle 30 will make line contact with the support bracket rather than point contact so as to support the utensil and cover therefor in a stable manner on the wall support 44.

The present invention provides an improved covered utensil including a container having a novel handle structure for permitting the mounting of the container and the cover therefor in a compact manner on a support bracket when it is desired to store the utensil. The container is adapted to be supported on such bracket by the cooperation of the hook portion on the handle and the flange circumscribing the open top of the container at an attitude such that the cover may be slid onto the bottom of the container and supported thereby without any ancillary attachment means.

Further, the container may be conveniently supported on a drawer by engaging the hook portion 40 over the top of the drawer. Similarly, the hook portion 40 may be readily engaged with a trim strip on the edge of a kitchen counter for permitting hanging of the container. Thus, the container itself can be hung in a convenient manner within ready reach of the housewife.

While I have shown and described a particular embodiment of my invention, it will be obvious to those skilled in the art that various changes and modifications may be made therein without departing from the invention. Therefore, it is intended in the appended claims to cover all such changes and modifications as fall within the true spirit and scope of the invention.

I claim:
1. A covered cooking utensil adapted to be supported on a support at an attitude such that the cover may be retained on the utensil without the necessity for extraneous attachment means, such utensil comprising a cup-shaped container having an open top circumscribed by an annular flange extending outwardly from the sides of the container, a cup-shaped cover having a flange circumscribed about the open end thereof, said cover flange adapted to be supported on said container flange, said cover having an internal configuration complementary to the external configuration of said container adjacent the bottom thereof, the sides of the container being tapered toward the open top substantially the same as the sides of the cover are tapered from the open end toward the bottom thereof, and a handle fixed to the side of the container, said handle having a hook-shaped portion defined partially surrounding the adjacent section of the container flange, said hook-shaped portion being spaced from said container flange on three sides and including a hooked end, terminating at a point outward from said flange, whose lower edge is above the container flange, said end cooperating with the container flange for supporting the container flange at an angle to the vertical that is greater than the angle of taper of the sides of the container, such that when the container is hung on a support, the hooked end of the handle and the container flange cooperate with one another and with the support to the hold the container at an attitude for supporting the cover on the bottom of the container.

2. A utensil adapted to be supported on a support bracket comprising the combination of a cup-shaped container having an open top and a flange adjacent to and circumscribing said open top, a cover complementary in configuration to the flange for closing the open top of the container, and a handle attached to the container for permitting manual manipulation of the container, said handle being joined at one end to the exterior of the container, the joinder of the handle to the container being below the open top of the container, said handle including a hook-shaped portion containing an end section spaced outwardly from the side of the container said end section having a lower surface which is above the flange on the top of the container, said hook-shaped portion cooperating with the flange for detachably supporting said handle on a bracket and for supporting the container at an angle inclined upwardly with respect to the vertical, the internal configuration of the cover being complementary to the external configuration of the container adjacent the bottom thereof, said cover being supported on the container solely by means of gravity when the container is supported on the bracket.

References Cited

UNITED STATES PATENTS

| | | | |
|---|---|---|---|
| 1,124,308 | 1/1915 | Dorau | 220—94 |
| 1,698,929 | 1/1929 | Wentorf | 220—94 |
| 2,186,365 | 1/1940 | Castles | 220—18 |
| 2,691,552 | 10/1954 | Bauman et al. | 16—110 |

THERON E. CONDON, *Primary Examiner.*

RAPHAEL H. SCHWARTZ, *Examiner.*